(12) United States Patent
Anderson et al.

(10) Patent No.: US 9,063,211 B2
(45) Date of Patent: Jun. 23, 2015

(54) NAVIGATION SYSTEM AND METHOD

(71) Applicant: Autonomous Tractor Corporation, Sandia, TX (US)

(72) Inventors: Terry Anderson, Spearfish, SD (US); Robert S. Cornelius, St. Paul, MN (US); Frank Artner, White Bear Lake, MN (US)

(73) Assignee: Autonomous Tractor Corporation, St. Michael, MN (US)

( * ) Notice: Subject to any disclaimer, the term of this patent is extended or adjusted under 35 U.S.C. 154(b) by 0 days.

(21) Appl. No.: 14/014,543

(22) Filed: Aug. 30, 2013

(65) Prior Publication Data
US 2014/0060949 A1    Mar. 6, 2014

Related U.S. Application Data

(60) Provisional application No. 61/695,555, filed on Aug. 31, 2012.

(51) Int. Cl.
| | | |
|---|---|---|
| *B60T 7/16* | (2006.01) | |
| *G01S 1/02* | (2010.01) | |
| *G05D 1/02* | (2006.01) | |

(Continued)

(52) U.S. Cl.
CPC .............. *G01S 1/022* (2013.01); *G05D 1/0236* (2013.01); *G05D 1/0257* (2013.01); *Y10S 903/902* (2013.01); *G05D 1/028* (2013.01); *G01S 5/021* (2013.01); *G01S 5/14* (2013.01); *G01S 13/865* (2013.01); *G01S 13/876* (2013.01); *G01S 13/878* (2013.01)

(58) Field of Classification Search
CPC ........ G01C 21/26; G01C 21/12; G01C 21/10; G01C 21/02; B60T 7/16; B62D 1/24
USPC .......... 180/167, 168; 701/400, 445, 409, 470, 701/480, 412, 408, 495
See application file for complete search history.

(56) References Cited

U.S. PATENT DOCUMENTS

| | | |
|---|---|---|
| 5,032,845 A | 7/1991 | Velasco |
| 5,420,794 A | 5/1995 | James |

(Continued)

FOREIGN PATENT DOCUMENTS

| | | |
|---|---|---|
| WO | WO-2014036367 A2 | 3/2014 |
| WO | WO-2014036367 A3 | 3/2014 |

OTHER PUBLICATIONS

International Application Serial No. PCT/US2013/057455, International Search Report mailed May 2, 2014, 4 pgs.

(Continued)

*Primary Examiner* — Hau Phan
(74) *Attorney, Agent, or Firm* — Schwegman, Lundberg & Woessner, P.A.

(57) ABSTRACT

A navigation system and associate methods are described that include a plurality of fixed terrestrial based reference devices that calibrate the system by tracking positional error between the fixed terrestrial based reference devices. A navigation system and associated methods are also described that include a laser positioning system. A navigation system and associated methods are described that include an RF positioning system. In one example, the laser positioning system, and the RF positioning system cross check one another to ensure reliability and accuracy of a position measurement.

6 Claims, 9 Drawing Sheets

(51) Int. Cl.
*G01S 5/02* (2010.01)
*G01S 5/14* (2006.01)
*G01S 13/86* (2006.01)
*G01S 13/87* (2006.01)

(56) References Cited

U.S. PATENT DOCUMENTS

| | | | |
|---|---|---|---|
| 5,508,917 A | 4/1996 | Siegle et al. | |
| 6,411,871 B1 * | 6/2002 | Lin | 701/27 |
| 6,560,535 B2 * | 5/2003 | Levy et al. | 701/409 |
| 6,859,729 B2 * | 2/2005 | Breakfield et al. | 701/2 |
| 7,266,477 B2 * | 9/2007 | Foessel | 701/1 |
| 7,739,034 B2 * | 6/2010 | Farwell | 701/445 |
| 7,979,172 B2 | 7/2011 | Breed | |
| 8,175,796 B1 | 5/2012 | Blackburn et al. | |
| 8,306,726 B2 * | 11/2012 | Donnelli et al. | 340/989 |
| 8,306,727 B2 * | 11/2012 | Morselli et al. | 701/300 |
| 8,779,967 B2 * | 7/2014 | Jones et al. | 342/22 |
| 2005/0060069 A1 | 3/2005 | Breed et al. | |
| 2005/0107954 A1 | 5/2005 | Nahla | |
| 2007/0005609 A1 * | 1/2007 | Breed | 707/10 |
| 2010/0324775 A1 | 12/2010 | Kermani et al. | |
| 2011/0063138 A1 | 3/2011 | Berkobin et al. | |

OTHER PUBLICATIONS

International Application Serial No. PCT/US2013/057455, Invitation to Pay Additional Fees and Partial Search Report mailed Feb. 20, 2014, 2 pgs.

International Application Serial No. PCT/US2013/057455, Written Opinion mailed May 2, 2014, 5 pgs.

* cited by examiner

NAVIGATION SYSTEM AND METHOD

RELATED APPLICATIONS

This application claims the benefit of priority to U.S. Provisional Application Ser. No. 61/695,555, filed on Aug. 31, 2012, which is hereby incorporated by reference herein in its entirety.

TECHNICAL FIELD

Various embodiments described herein relate to apparatus, systems, and methods associated with vehicle navigation.

BACKGROUND

Navigation devices for vehicles typically use a positioning system to locate a vehicle with respect to one or more known reference locations. Position data collected over time can provide information such as vehicle speed and direction, in addition to a vehicle location. Laser positioning systems are accurate, however, they have the limitation that they need to have a direct line of sight between a laser generator and a reference point. Global Positioning Systems (GPS) provide location information for navigation, but also have limitations, such as satellite interference from objects such as tree cover. Improved navigation systems are desired to provide reliable positioning information in challenging conditions that improve over existing systems such as laser positioning, and GPS.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

Figure 1:
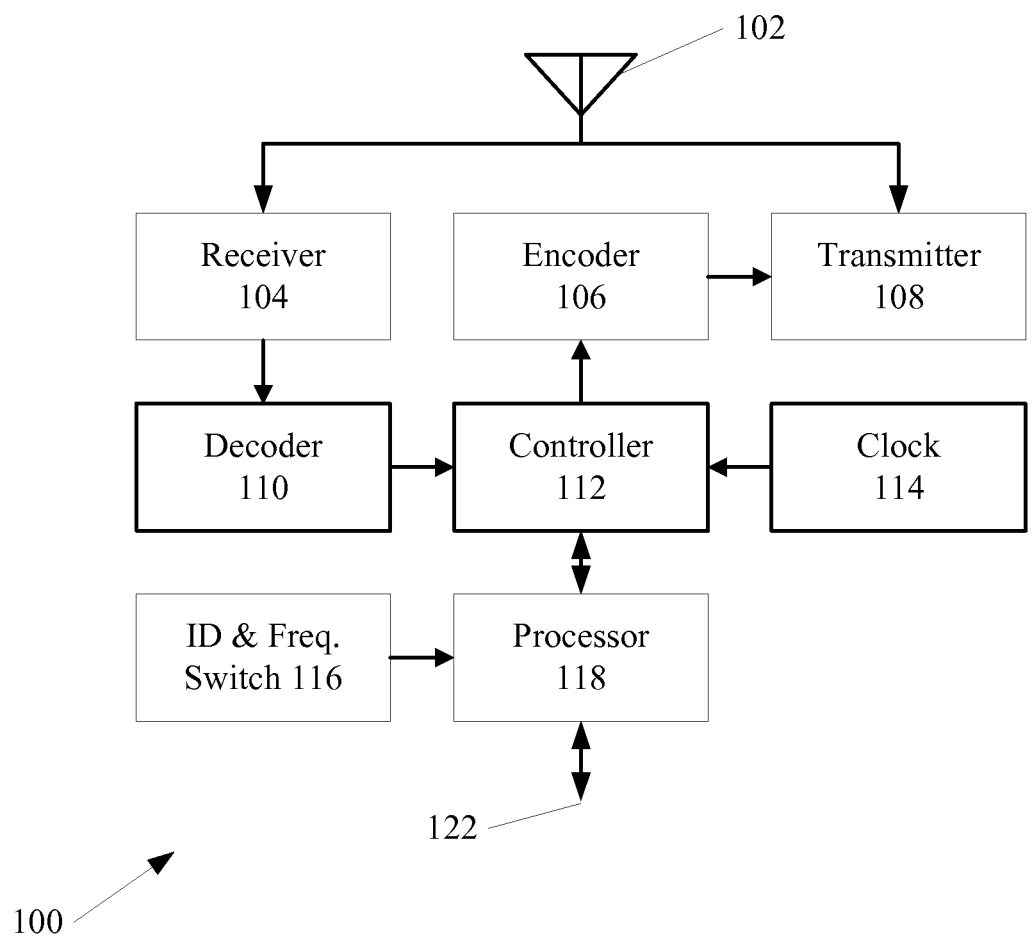
FIG. 1 shows a block diagram of a reference circuit according to an embodiment of the invention.

FIG. 1 shows an example block diagram of a reference circuit 100. In one example, the reference circuit 100 includes one or more elements of a wave signal positioning system. In one example, the wave signal is a radio frequency (RF) signal. In one example, the RF positioning system operates at approximately 150 MHz. In one example, the RF positioning system operates in a range between approximately 140 and 160 MHz. In one example, RF positioning system operates in a range between approximately 150 and 155 MHz.

In one example, the RF positioning system operates as a synchronous frequency system. In one example, the RF positioning system operates as an amplitude modulated (AM) system. In one example, the RF positioning system encodes a signal digitally using an AM system. Using an AM system, and digital transmission, a signal may be sent under a federal communication commission (FCC) part 15 threshold which does not require FCC licensing. By using digital transmission, in one example, a logical "0" may be transmitted as approximately half power, and a logical "1" may be transmitted at approximately full power. An average wattage will be less than full power, which does not require a license under FCC regulations.

An antenna 102 is shown coupled to a receiver 104 and a transmitter 108. In one example, an encoder 106 is coupled to the transmitter 108. A controller 112 is shown coupled to the receiver 104 and the transmitter 108. An identification (ID) and frequency switch 116 is shown coupled to the controller 112 through a processor 118.

In one example, an incoming RF signal from a vehicle or other reference device is received at the receiver 104, and processed through the controller 112. The switch 116 ensures that the signal includes an expected frequency and ID from the vehicle or other reference device. In one example, a signal is then sent from the reference device 100 using the transmitter 108, to be received at the vehicle or other reference device. In one example, a distance is determined by time of flight calculations. In one example, a distance is determined by interferometry. In one example, a distance is determined by both time of flight, and interferometry.

A clock 114 is shown, coupled to controller 112. In operation, the clock 114, and controller 112 use an encoder 106 to reference a precise time to a transmitted signal. In one example, the clock 114 is precise to within approximately 100 pico seconds per cycle. A decoder 110 is shown coupled to the receiver 104 to compare with the encoded signal and calculate a precise time of flight of a transmitted signal. An identification (ID) and frequency switch 116 is shown coupled to a processor 218. In one example, the identification (ID) and frequency switch 116 provides a unique signal identification that can be used with multiple 100.

In one example, a number of reference circuits 100 are located around a perimeter of an agricultural area, such as a field. In one example, one or more references circuits 100 are also located on a vehicle within the agricultural area. In selected examples, it is advantageous for manufacturing efficiency to use the same or similar reference circuits 100 in fixed location devices around the perimeter of the agricultural area, as well as on the vehicle to be located within the agricultural area.

Figure 2:
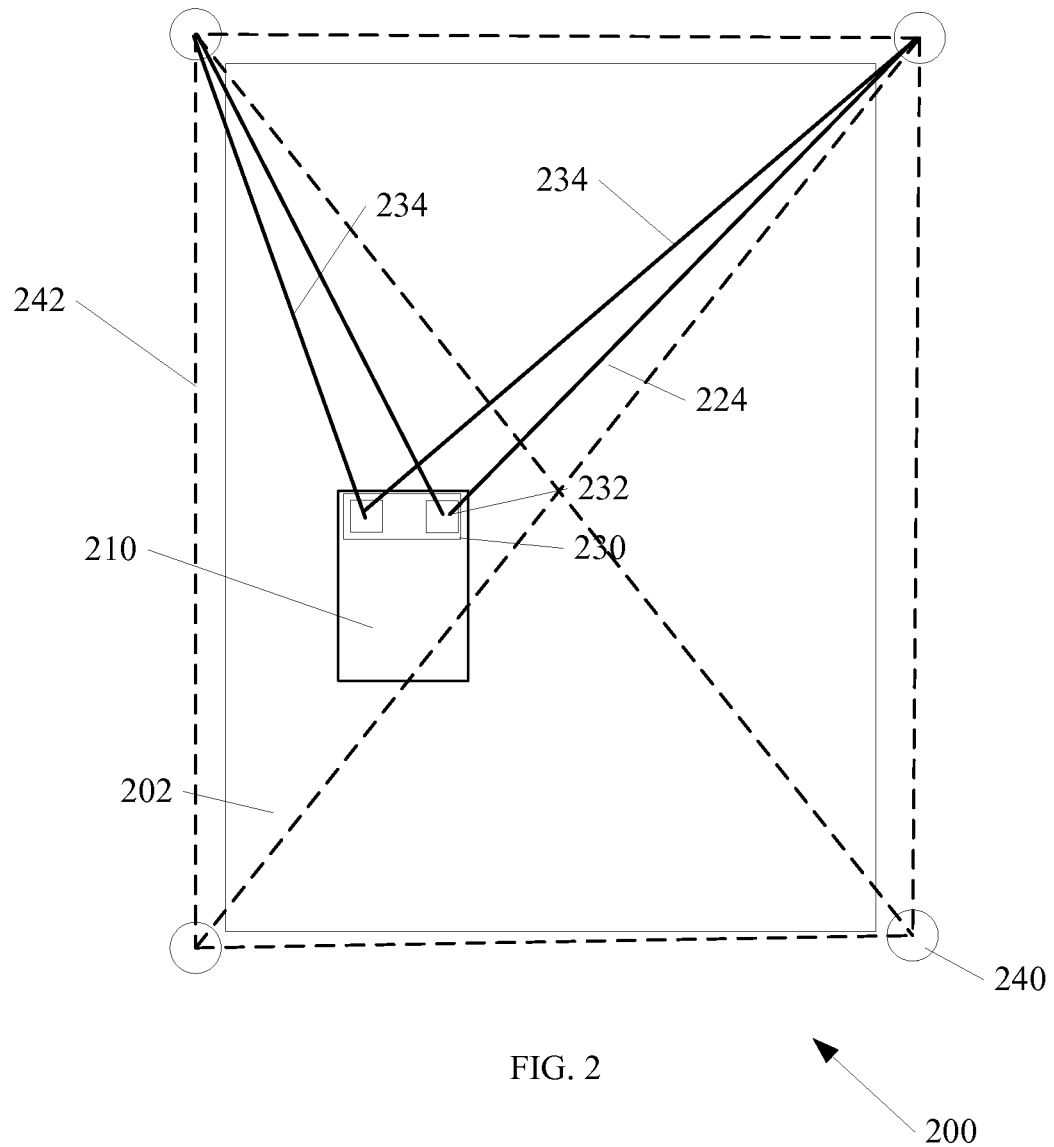
FIG. 2 shows a diagram of an example vehicle navigation system in use according to an embodiment of the invention.

FIG. 2 shows a diagram view of an example vehicle navigation system in use according to an embodiment of the invention. A vehicle 210 is shown in an area 202 within which navigation is desired. In one example, the area 202 is an agricultural field, although the invention is not so limited. The vehicle 210 includes a mobile positioning system 230 similar to examples described above. In one example, the mobile positioning system 230 includes an RF positioning system 232 that includes a reference circuit 100 as described above. In one example the mobile positioning system 230 includes two or more RF positioning systems 232 that include a reference circuit 100 as described above. The RF positioning system 230 is shown emitting RF signals 234.

In the example shown, a number of 240 are positioned around the area 202. Although four 240 are shown, the invention is not so limited. Any number of 240 may be used that are effective to provide a vehicle location within the area 202. In one example, the 240 includes a reference circuit similar to reference circuit 100 of FIG. 1. In one example, one or more of the 240 includes a focused antenna directed within the area 202. In some embodiments, such a configuration may reduce interference with other RF signals, and may improve signal integrity.

In operation, the vehicle 210 calculates a position within the area 202 using distances to multiple 240 as shown in the Figure. In one example, using two or more RF positioning systems 232 on the vehicle provides additional detail regarding orientation of the vehicle 210 within the area 202 (such as pointing north, south, east, west, etc.) In one example, additional detail such as speed, acceleration, deceleration, etc., within the area 202, are also provided using position and orientation over time.

In one example, in addition to calculating the position of the vehicle 210 within the area 202, the reference devices 240 also calculate a distance between other reference devices 240. In one example, the reference devices 240 calculate a distance between other reference devices 240 over time. In FIG. 2, multiple reference devices 240 are shown measuring known distances between each other using signals 242.

One technical challenge with position systems has been position error due to drift of measurement devices such as reference circuit 100 over time. In one example, a drift in position of each reference device 240 is tracked over time. Because each reference device 240 is known to be in a fixed location, any drift in measured position is known to be an error.

In one example, the position error is caused by drift of the clock 114 in the reference circuit 100. By measuring the error over time, the error can be compensated for. In one example, the clock is corrected over time, and synched for all reference circuits 100, including reference circuits 100 located on the vehicle 210. Accuracy of vehicle 210 position and orientation are greatly improved using systems that monitor error over time, and compensate for the error as described.

Figure 3:
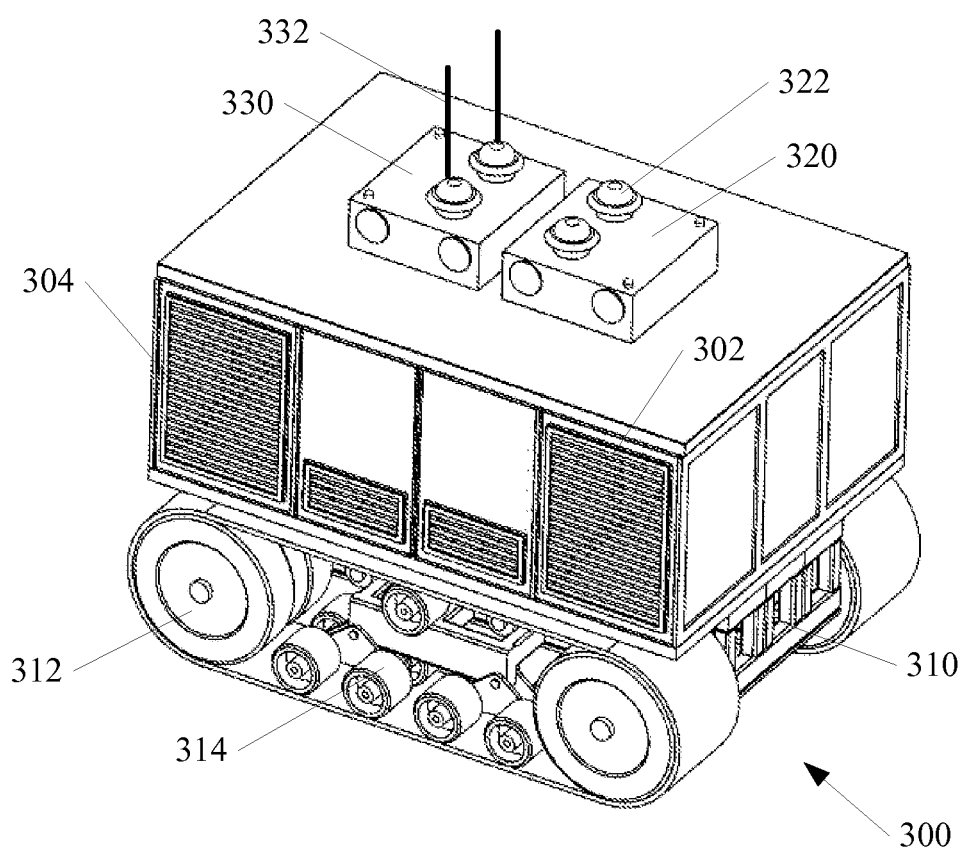
FIG. 3 shows an example vehicle using a vehicle navigation system according to an embodiment of the invention.

FIG. 3 shows an example vehicle 300 that may be used with embodiments of the navigation system described above. In one example, the vehicle 300 is configured to operate as an agricultural vehicle, such as a tractor. The vehicle 300 includes a vehicle frame 310, and a first diesel electric power supply 302 coupled to the vehicle frame 310. In one example, the vehicle 300 further includes a second diesel electric power supply 304 coupled to the vehicle frame 310. The use of two power supplies provides a level of redundancy and ease of repair. In the example shown, the vehicle 300 includes drive wheels 312 and a pair of track belts 314 running over the drive wheels 312. In one example, the drive wheels 312 each include an electric motor drive mounted substantially within a hub of the drive wheel 312 that is powered by one or more of the diesel electric power supplies 302, 304. In one example, all four drive wheels 312 include an electric motor.

The vehicle 300 of FIG. 3 shows a first mobile positioning system 320. In one optional example, a pair of lasers 322 are optionally included, as part of a laser positioning system. In one example, a second mobile positioning system 330 is shown, that includes a pair of RF positioning systems 332. In one example, each RF positioning system 332 includes a reference circuit similar to circuit 100 from FIG. 1.

In selected laser equipped options, each laser 322 may include a rotating laser. In one example, a rotating laser 322 includes logic to provide both angle, and distance data. In one example, a rotating laser 322 is used, with an angle precision of approximately 0.01 degrees. In one example, the distance data is provided by interferometry. In one example, the laser distance is precise to within approximately 1 millimeter. In one example, more than one laser 322 is used to provide a cross check of data received from a first laser.

In one example, a laser positioning system, and an RF positioning system cross check one another to ensure reliability and accuracy of a position measurement. One advantage to such an arrangement includes the ability of the RF positioning system to provide accurate position, even in foggy or dusty conditions. In addition, and RF positioning system functions well over terrain, such as hilly terrain, where a laser positioning system has limited, or no line of sight with a reference device. Another advantage of a configuration including both a laser positioning system, and an RF positioning system includes the ability of the laser positioning system to periodically calibrate the RF positioning system. In one example a laser positioning system can be used to periodically calibrate the clock 114, which may be used for time of flight calculations in the RF positioning system.

Figure 4:
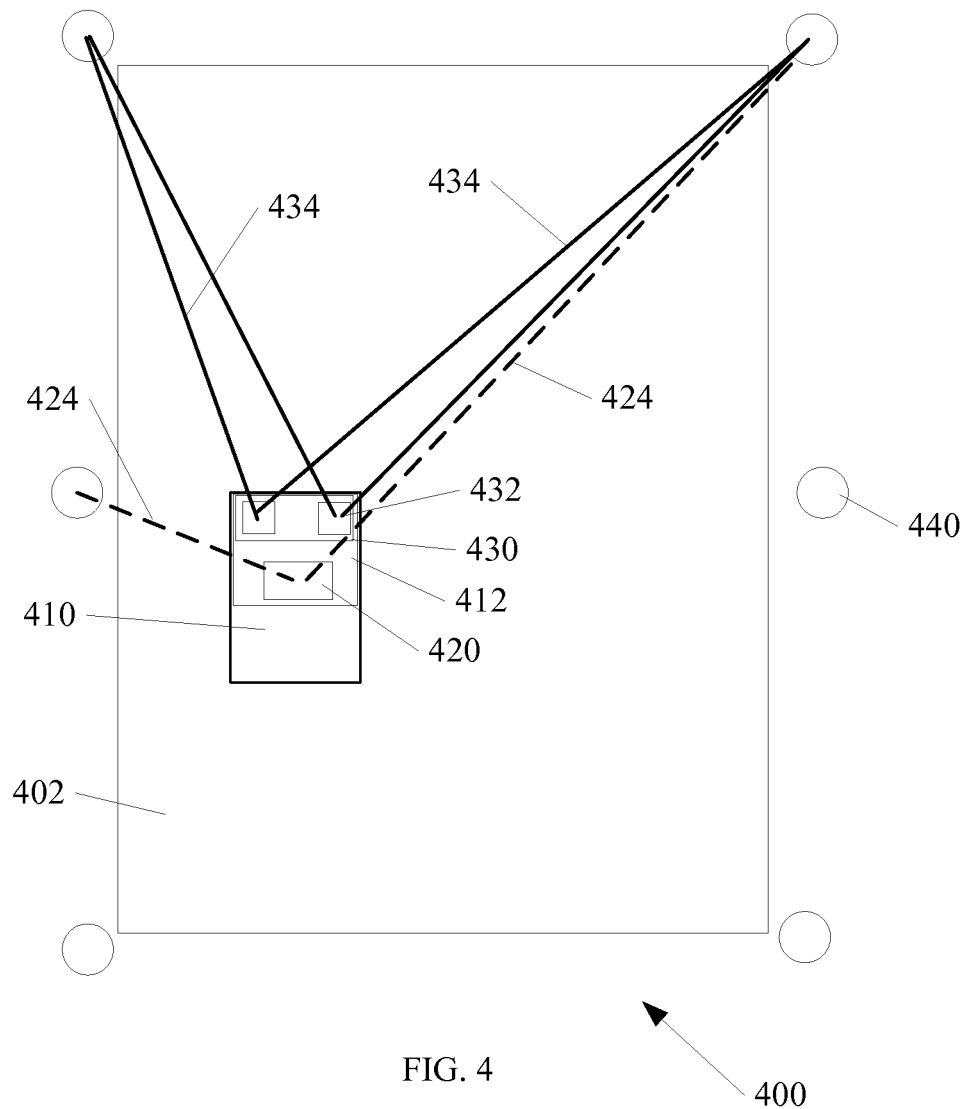
FIG. 4 shows a diagram of another example vehicle navigation system in use according to an embodiment of the invention.

FIG. 4 shows a diagram view of an example vehicle navigation system in use according to an embodiment of the invention. A vehicle 410, similar to the vehicle 300 of FIG. 300, is shown in an area 402 within which navigation is desired. In one example, the area 402 is an agricultural field, although the invention is not so limited. The vehicle 410 includes a mobile positioning system 412 similar to examples described above. In one example, the mobile positioning system 412 includes an RF positioning system 420 and a laser positioning system 430. A pair of rotating laser 432 are shown emitting laser beams 434. The RF positioning system 420 is shown emitting RF signals 424.

In the example shown, a number of 440 are positioned around the area 402. Although six 440 are shown, the invention is not so limited. Any number of 440 may be used that are effective to provide a vehicle location within the area 402. In one example, the 440 include circuitry similar to the circuitry shown in reference device 100 of FIG. 1. In one example, one or more of the 440 includes a focused antenna directed within the area 402. In some embodiments, such a configuration may reduce interference with other RF signals, and may improve signal integrity. In operation, the vehicle 410 uses both positioning information from the RF positioning system 420 and the laser positioning system 430 to determine a location within the area. In one example, additional information, such as velocity and direction of travel are provided from the RF positioning system 420 and the laser positioning system 430.

Figure 5:
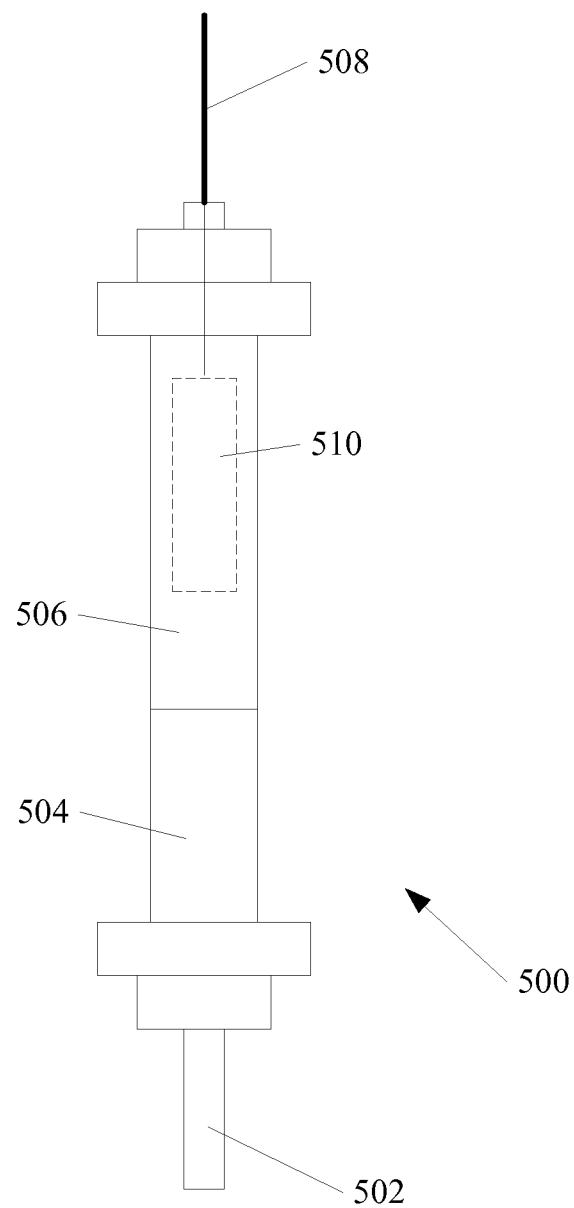
FIG. 5 shows an example reference device according to an embodiment of the invention.

FIG. 5 shows one example of a reference device 500, such as the reference device 100 from FIG. 1, or the 440 from FIG. 4. Circuitry 510 is shown housed within the reference device 500, such as circuitry described in FIG. 1. An antenna 508 is shown coupled to the circuitry 510. In selected examples, a laser reflector 504 is included. In one example, a solar panel 506 is included on an exterior surface of the reference device 500. Although solar power is desirable to reduce cost of operation and for remote locations, other power supply options such as battery only, or hard wiring to a city power grid are within the scope of the invention.

In one example, the reference device 500 may be formed from a readily available source material, such as poly vinyl chloride (PVC) pipe, which is weather resistant and resistant to mechanical damage. A mounting rod 502 is shown coupled to the reference device 500 for mounting about a perimeter of an area, such as area 402 from FIG. 4.

Figure 6A:
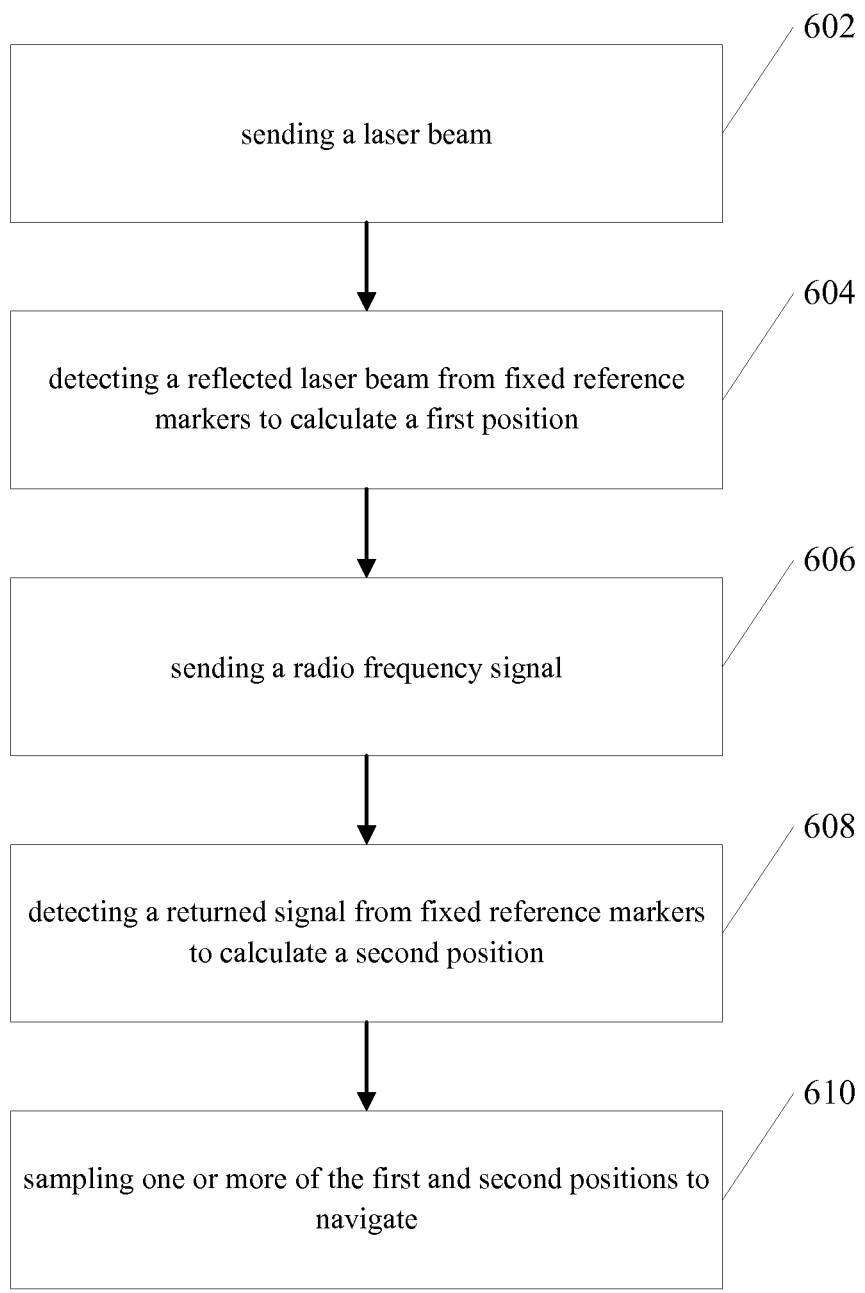
FIG. 6A shows a flow diagram of a method of operation of a vehicle navigation system according to an embodiment of the invention.

FIG. 6A describes one example method of operation of a navigation system using example devices described above. In operation 602, a laser beam is sent, for example, from a mobile positioning system. In operation 604, a reflected laser beam is detected, for example, from fixed reference devices, and a laser referenced vehicle position is calculated with respect to the fixed reference devices. In operation 606, a radio frequency signal is sent, for example, from a transceiver on a vehicle to two or more transponders on a fixed reference device. In operation 608, a returned signal is detected, for example, from two or more transponders and a radio frequency referenced vehicle position is calculated with respect to the fixed. In operation 610, one or more of the laser referenced vehicle position and radio frequency referenced vehicle position are sampled over time to determine vehicle navigation parameters.

Figure 6B:
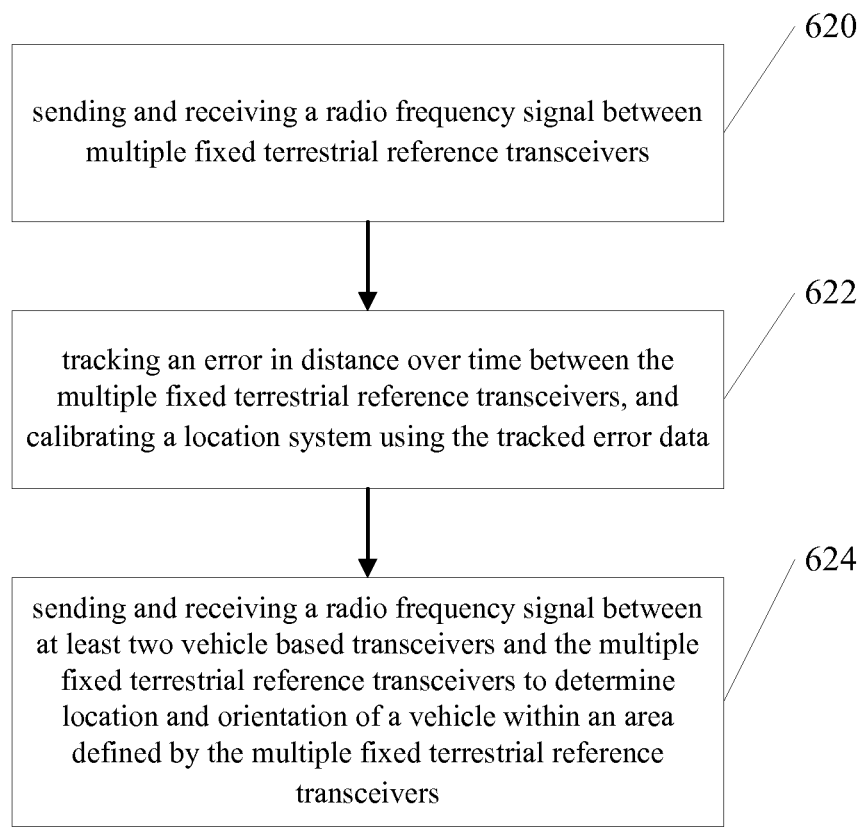
FIG. 6B shows another flow diagram of a method of operation of a vehicle navigation system according to an embodiment of the invention.

FIG. 6B describes another example method of operation of a navigation system using example devices described above. In operation 620, a radio frequency signal is sent and received between multiple fixed terrestrial reference transceivers. In operation 622, an error in distance is tracked over time between the multiple fixed terrestrial reference transceivers, and calibrating a location system using the tracked error data. In operation 624, a radio frequency signal is sent and received between at least two vehicle based transceivers and the multiple fixed terrestrial reference transceivers to determine location and orientation of a vehicle within an area defined by the multiple fixed terrestrial reference transceivers.

In selected examples, a vehicle may drive a perimeter of an area such as area 402, and store a map of the area 402 within device memory. In selected embodiments, such a preliminary operation further ensures that the vehicle will stay within the area 402 during operation. In one example, the preliminary drive around the perimeter of the area 402 may be accomplished using human navigation, while subsequent navigation of a vehicle within the area 402 may be accomplished using an autonomous vehicle, and navigation systems as described above.

Figure 7:
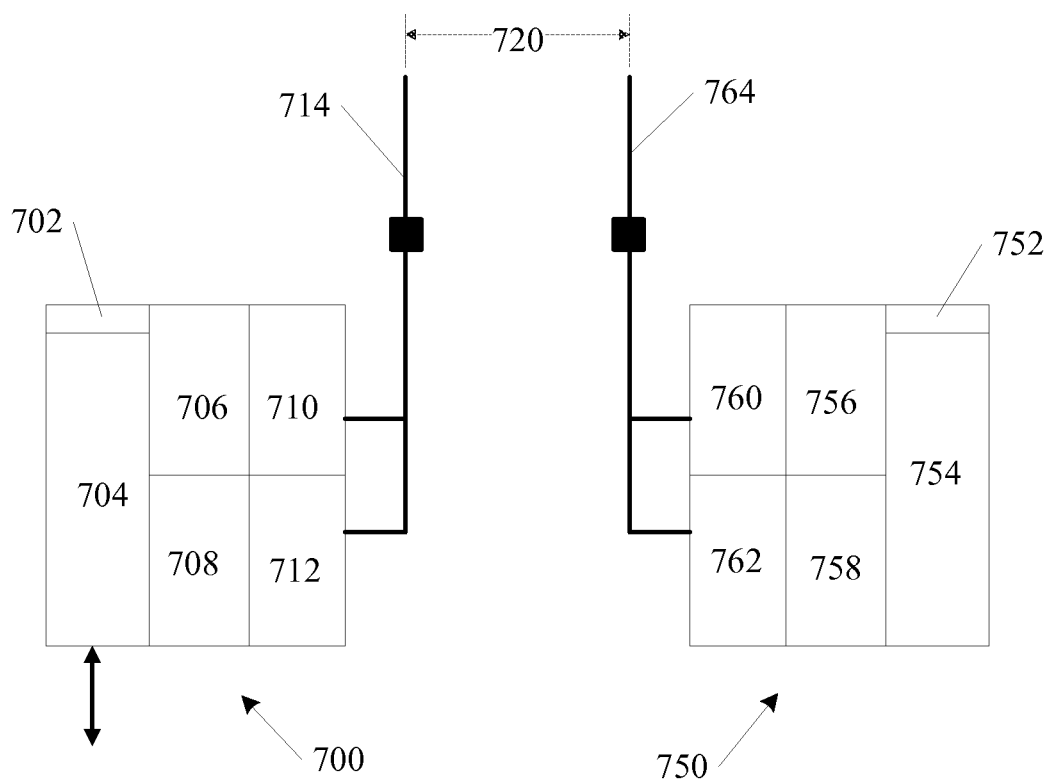
FIG. 7 shows a block diagram of a positioning system according to an embodiment of the invention.

FIG. 7 shows a block diagram of a positioning system according to an embodiment of the invention. A transceiver 700 is located on a vehicle, for example an autonomous vehicle such as vehicle 300 from FIG. 3. A transponder 750 is also illustrated in FIG. 7. In one example, the transponder 750 is located on a fixed reference device, such as reference device 500 from FIG. 5. In one example, the transponder 750 is located on multiple positions that are spaced apart on a grid, and are not necessarily located at edges of any one field or property line. In one example the transponder 750 is located on already existing Real Time Kinematic (RTK) towers along with already existing GPS systems. RTK towers are typically used in conjunction with Global Positioning Systems (GPS). Utilization of RTK towers is cost efficient, and convenient because the system of spaced reference locations are already in existence. In one example, a range of operation 720 between the transceiver 700 and the transponder 750 is approximately 20 miles. In one example the transceiver 700 and the transponder 750 include substantially similar reference circuits such as the reference circuit 100 shown in FIG. 1.

The example transceiver 700 of FIG. 7 includes a unit identification circuit 702 that is capable of storing a unique identification number for the vehicle. The transceiver 700 shown further includes a processor logic 704. In one example, a digital to analog conversion circuit 706 and an analog to digital conversion circuit 708 are included. In one example, a radio frequency transmitter 710 and a radio frequency receiver 712 are included. In one example the radio frequency transmitter 710 and the radio frequency receiver 712 operate on VHF frequencies. In one example, the frequency is approximately 150 MHz. An antenna 714 is shown to transmit and receive signals in operation of the transceiver 700.

The example transponder 750 of FIG. 7 includes a unit identification circuit 752 that is capable of storing a unique identification number for the reference device. The transponder 750 shown further includes a processor logic 754. In one example, a digital to analog conversion circuit 756 and an analog to digital conversion circuit 758 are included. In one example, a radio frequency transmitter 760 and a radio frequency receiver 762 are included. In one example the radio frequency transmitter 760 and the radio frequency receiver 762 operate on VHF frequencies. In one example, the frequency is approximately 150 MHz. An antenna 764 is shown to transmit and receive signals in operation of the transponder 750.

Figure 8:
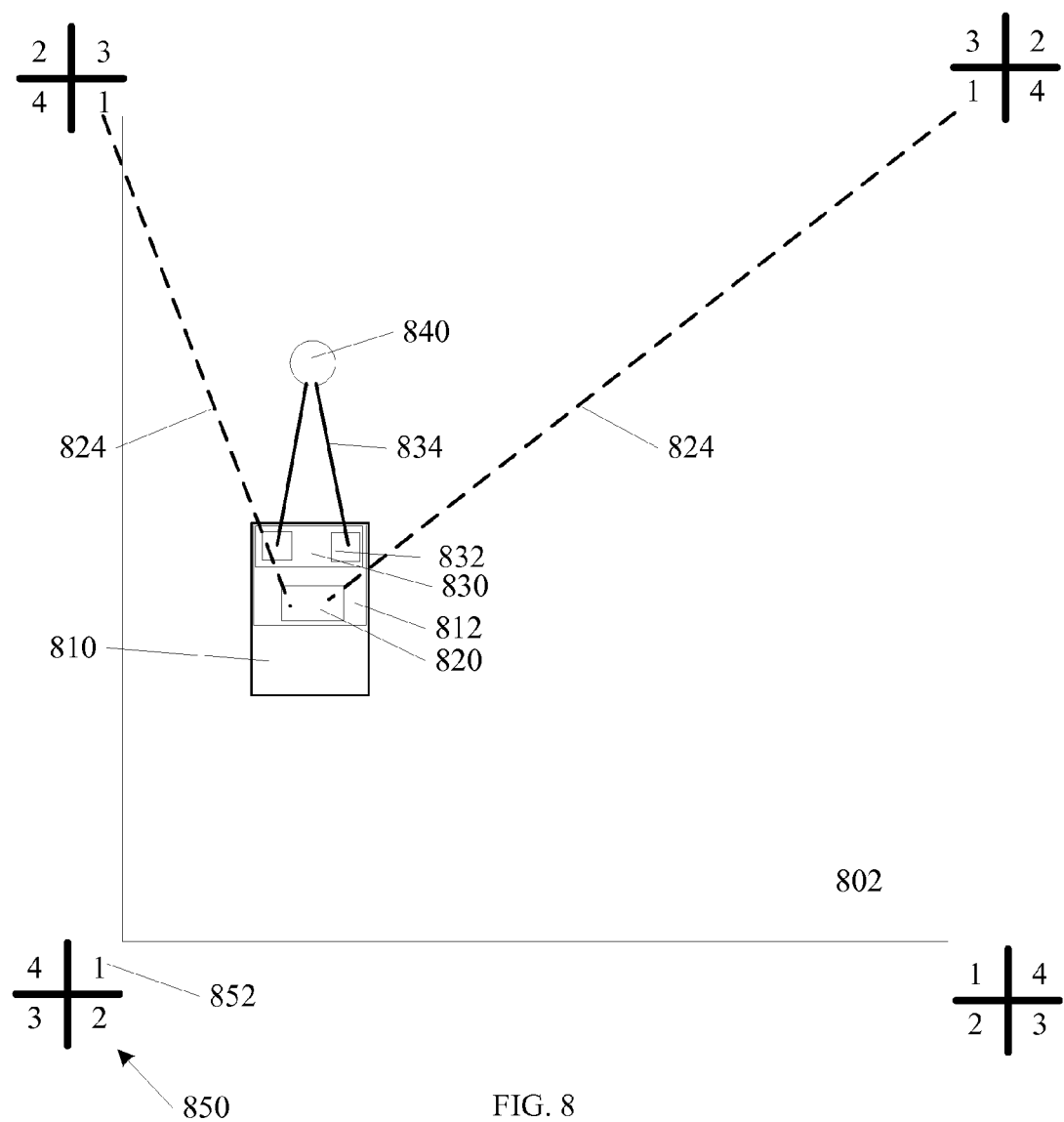
FIG. 8 shows a diagram of an example vehicle navigation system in use according to an embodiment of the invention.

FIG. 8 shows a diagram view of an example vehicle navigation system in use according to an embodiment of the invention. A vehicle 810, similar to the vehicle 300 of FIG. 300, is shown in an area 802 within which navigation is desired. In one example, the area 802 is an agricultural field. In one example, the area 802 is a portion of a geographic grid. In one example, the area 802 is approximately 8 miles square. In one example, the area 802 is defied between already existing RTK towers, as described above.

The vehicle 810 includes a mobile positioning system 812 similar to examples described above. In one example, the mobile positioning system 812 includes an RF positioning system 820. In one example, a laser system 830 is also included. A pair of rotating laser 832 are shown emitting laser beams 834. The RF positioning system 820 is shown emitting RF signals 824.

In the example shown, a number of reference devices 850 are positioned around the area 802. As described above, in one example, the reference devices 850 are located on a grid, such as a grid defined by preexisting RTK towers. In other examples, any number of reference devices 850 may be used that are effective to provide a vehicle location within the area 802. In one example, the reference devices 850 include circuitry similar to the circuitry shown in transponder 750 of FIG. 7. In one example, one or more of the reference devices 850 include a focused antenna 852 directed within the area 802. In the example of FIG. 8, a zone labeled "1" is focused by four corner 850.

In some embodiments, such a configuration may reduce interference with other RF signals, and may improve signal integrity. In operation, the vehicle 810 uses positioning information from the RF positioning system 820. In one example, the vehicle 810 uses laser system 830 for safety to detect possible unwanted objects 840 within a path of the vehicle 810. In one example, additional information, such as velocity and direction of travel are provided from the RF positioning system 820.

To better illustrate the method and apparatuses disclosed herein, a non-limiting list of embodiments is provided here:

Example 1 includes a vehicle navigation system including at least two vehicle mounted radio frequency transceivers spaced apart from one another on a vehicle, a plurality of reference devices to place at a plurality of fixed terrestrial reference locations, to define a circumference of a navigation area, wherein each reference device includes a fixed radio frequency transceiver to interact with the vehicle mounted radio frequency transceivers and with the other reference devices of the plurality of reference devices, and a calibration system located on the plurality of reference devices, wherein a location error between the plurality of reference devices is tracked and used to calibrate actual locations of the plurality of reference devices and the at least two vehicle mounted radio frequency transceivers within the navigation area.

Example 2 includes the vehicle navigation system of example 1 wherein the vehicle mounted radio frequency transceivers and the fixed radio frequency transceivers include VHF transceivers.

Example 3 includes the vehicle navigation system of any one of examples 1-2, wherein the vehicle mounted radio frequency transceivers and the fixed radio frequency transceivers operate at approximately 150 MHz.

Example 4 includes the vehicle navigation system of any one of examples 1-3, wherein the plurality of reference devices are solar powered.

Example 5 includes the vehicle navigation system of any one of examples 1-4, wherein the plurality of reference devices include focused radio frequency antennae.

Example 6 includes a vehicle navigation system including a laser positioning system, including a laser mounted on a vehicle, and a stationary reflector mounted in at least one reference location, a radio frequency positioning system, including a clock to time radio signals between a transceiver mounted on the vehicle, and the at least one reference location, wherein the laser positioning system is configured to calibrate the radio frequency positioning system, and a plurality of reference devices to place at fixed locations adjacent to a navigation area, wherein each reference device includes a laser reflector to interact with a laser on the vehicle, and a radio frequency transponder to interact with a radio frequency transceiver on the vehicle.

Example 7 includes the vehicle navigation system of example 6 wherein the plurality of reference devices are solar powered.

Example 8 includes the vehicle navigation system of any one of examples 6-7, wherein the radio frequency positioning system operates at approximately 150 MHz.

Example 9 includes the vehicle navigation system of any one of examples 6-8, wherein the plurality of reference devices include focused radio frequency antennae.

Example 10 includes an autonomous vehicle, including a diesel electric power supply coupled to a vehicle frame, a number of electric motor powered drive wheels mounted to the frame, and electrically coupled to the diesel electric power supply, a pair of track belts running over the drive wheels on sides of the vehicle frame, a laser positioning system, including a laser mounted on a vehicle, and a stationary reflector mounted in at least one reference location, and a radio frequency positioning system, including a clock to time radio signals between a transceiver mounted on the vehicle, and the at least one reference location, wherein the laser positioning system is configured to calibrate the radio frequency positioning system.

Example 11 includes the autonomous vehicle of example 10, and further includes a pair of diesel electric power supplies.

Example 12 includes the autonomous vehicle of any one of examples 10-11, wherein each drive wheel has an electric motor mounted substantially within a hub of the drive wheel.

Example 13 includes the autonomous vehicle of any one of examples 10-12, and further includes four independent drive wheels with an electric motor mounted substantially within a hub of the drive wheel.

Example 14 includes a method of navigating an autonomous vehicle, including, sending a radio frequency signal from a transceiver on a vehicle to two or more transceivers on corresponding two or more land based fixed reference devices, detecting a returned signal from the two or more transceivers and calculating a radio frequency referenced vehicle position with respect to the land based fixed reference devices, sending a laser beam from a laser source mounted on the vehicle to check for potential obstacles in a path of the vehicle, and processing laser based data and radio frequency data to determine vehicle navigation parameters.

Example 15 includes the method of example 14, wherein sending a radio frequency signal includes sending a VHF signal.

Example 16 includes a method, including sending and receiving a radio frequency signal between multiple fixed terrestrial reference transceivers, tracking an error in distance over time between the multiple fixed terrestrial reference transceivers, and calibrating a location system using the tracked error data, and sending and receiving a radio frequency signal between at least two vehicle based transceivers and the multiple fixed terrestrial reference transceivers to determine location and orientation of a vehicle within an area defined by the multiple fixed terrestrial reference transceivers.

Example 17 includes the method of example 16, wherein sending a radio frequency signal between multiple fixed terrestrial reference transceivers includes sending a VHF signal.

Example 18 includes the method of any one of examples 16-17, and further includes sending a vehicle identification code along with the radio frequency signal.

These and other examples and features of the present systems, devices and methods are set forth in part in the above detailed description. This overview is intended to provide non-limiting examples of the present subject matter—it is not intended to provide an exclusive or exhaustive explanation.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A vehicle navigation system, comprising:
   a laser positioning system, including a laser mounted on a vehicle, and a stationary reflector mounted in at least one reference location;
   a radio frequency positioning system, including a clock to time radio signals between a transceiver mounted on the vehicle, and the at least one reference location, wherein the laser positioning system is configured to calibrate the radio frequency positioning system; and
   a plurality of reference devices to place at fixed locations adjacent to a navigation area, wherein each reference device includes a laser reflector to interact with a laser on the vehicle, and a radio frequency transponder to interact with a radio frequency transceiver on the vehicle.

2. The vehicle navigation system of claim 1, wherein the plurality of reference devices are solar powered.

3. The vehicle navigation system of claim 1, wherein the radio frequency positioning system operates at approximately 150 MHz.

4. The vehicle navigation system of claim 1, wherein the plurality of reference devices include focused radio frequency antennae.

5. A method of navigating an autonomous vehicle, comprising:
   sending a radio frequency signal from a transceiver on a vehicle to two or more transceivers on corresponding two or more land based fixed reference devices;
   detecting a returned signal from the two or more transceivers and calculating a radio frequency referenced vehicle position with respect to the land based fixed reference devices;
   sending a laser beam from a laser source mounted on the vehicle to check for potential obstacles in a path of the vehicle; and
   processing laser based data and radio frequency data to determine vehicle navigation parameters.

6. The method of claim 5, wherein sending a radio frequency signal includes sending a VHF signal.

* * * * *